Figure 1:
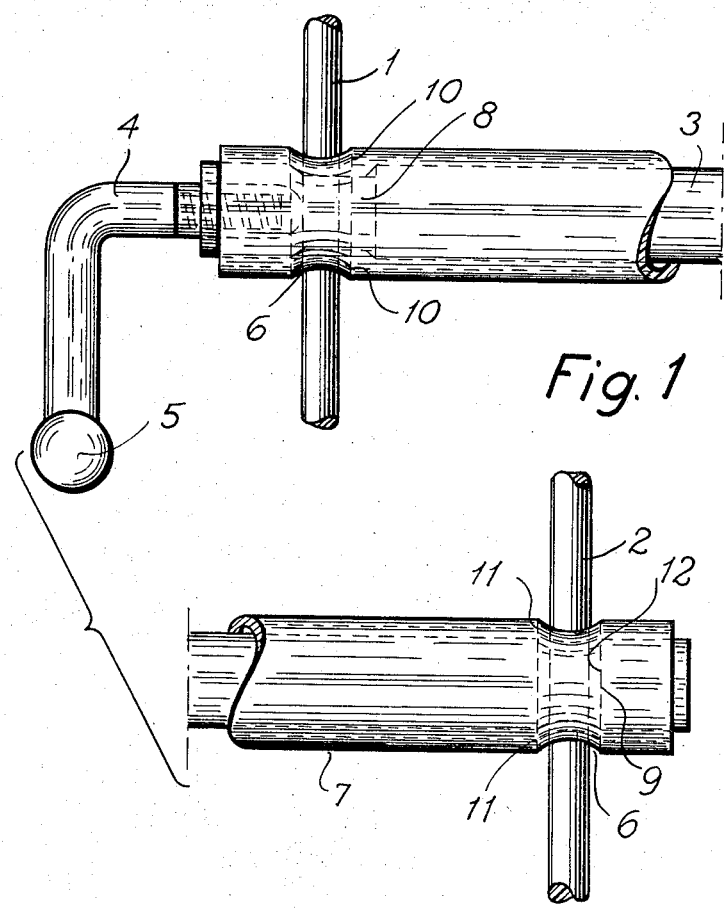

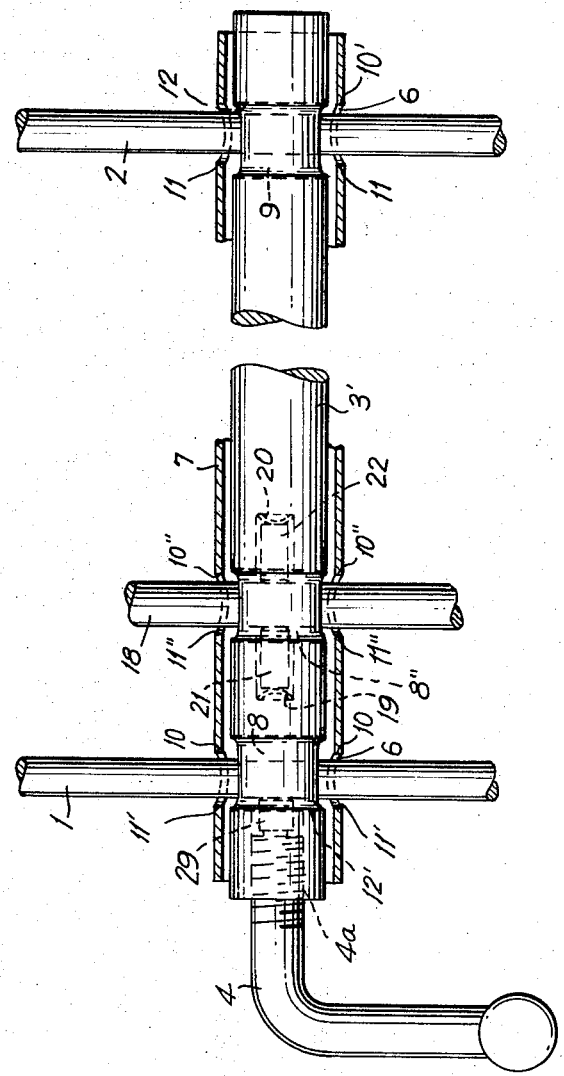

United States Patent Office 3,341,234
Patented Sept. 12, 1967

3,341,234
CLAMPING MECHANISM FOR THE CLAMPING OF AT LEAST TWO BARS IN PROPORTION TO AN AXIS CROSSING THE BARS
Georg Peter Christian Nielsen, Copenhagen, Denmark, assignor to Firm Allan Christensen & Co., Copenhagen, Denmark
Filed July 16, 1964, Ser. No. 383,063
9 Claims. (Cl. 287—51)

The invention relates to a clamping mechanism for the clamping of at least two bars in relation to an axis crossing the bars.

An object of the invention is to provide a clamping mechanism with a single operating member, by means of which two or more bars crossing a common axis simultaneously can be fixed, the bars being retained at the same time and by, in the main, an equal amount of force. The invention can be used within a great many scopes, for example, for adjustable hospital beds with foldable sections, where it is desired to be able to clamp the arms forming the support at either side of such a section simultaneously and with a single grip performed from one side. The clamping mechanism according to the invention may also be used advantageously in scaffoldings, foldable hoods, awnings and the like.

The clamping mechanism according to the invention is characterized by a spindle extending along the said axis which is movable in its longitudinal direction and has at one end an axially movable pressure member, which is so arranged that it can be caused to exert a pressure against the side of one of the bars to be clamped by the motion of the spindle, the said bar being retained from motion in the lateral direction by a fixed stop or rest at either side of the axis, whereby a transverse pressure surface on the spindle directed against the pressure member is so arranged that at the motion of the spindle it can retain another bar by pressing same against two fixed stops or rests, which are situated on either side of the spindle.

By this arrangement is obtained that the operation of the pressure member at one end of the spindle, causes clamping of one bar and displacement of the spindle in the longitudinal direction so that the pressure surface squeezes the other bar against the fixed stops with the same force as the one by which the first-mentioned bar is clamped between the pressure member and the stops or rests preventing this bar from being displaced in the lateral direction.

A preferred embodiment of the clamping mechanism according to the invention is characterized by the arrangement wherein the spindle is located in a pipe having transverse holes for the bars to be clamped, which bars, moreover, extend through transverse voids in the spindle, whereby the void for the bar on which the pressure member is operating has such an extent in the longitudinal direction that the spindle can be displaced freely for clamping of the other bar by off-setting of the pertaining transverse void in the spindle in proportion to the holes in the pipe. The edges of the transverse holes in the pipe form simple, fixed rests for the bars, while one side of the void for the said other bar forms the pressure surface whereby this bar is retained. This arrangement affords a central draw on the spindle, and the bars to be clamped can be given a certain movability in the lateral direction by adequate dimensioning of the holes in the pipe. Another advantage is that the pipe, which provides the fixed rests, against which the bars are clamped, can be easily fitted into any structure whatsoever.

The pressure member can be caused to move in proportion to the spindle in an arbitrarily desired manner, for example hydraulically, but as a rule it is sufficient to use an uncomplicated design of the clamping mechanism, in which the press unit is a self-stopping threaded bolt screwed into the spindle, which extends into the void for the adjacent bar to be clamped, and which carries, outside the spindle, a transverse arm. By using such a clamping mechanism, for example, for the clamping of a foldable part of a hospital bed, which should be supported at both sides of the bed, security is obtained that this is always the case when the section of the bed in question is folded and secured by means of the threaded bolt at one side of the bed. By the known clamping mechanisms, where clamping of a foldable head or foot section must be made from both sides, frequently only one retaining screw is tightened, whereby a false security is provided, and the section involved is exposed to collapse.

The threaded bolt, according to the invention, may adequately by provided with a thrust shoe resting against the surface of the bar to be clamped, which affords an increase of the friction surface and thereby more secure clamping, the bar being at the same time protected from bending stresses at individual points.

In many cases the bars to be clamped are not located on a common level, and sometimes it may be desirable that the bars, independently of one another, have a certain revolvability around their common axis. This is obtained by a constructional embodiment for the clamping mechanism according to the invention, which is unique in that the spindle is located in a pipe, which is cut at one place between two bars to be clamped, and thereby the spindle is composed of two parts which are mutually connected between the said bars, so that they are freely revolvable around their common longitudinal axis.

The two spindle sections may be mutually connected in an uncomplicated manner by means of a threaded joint and may be mutually lockable by means of a transverse set screw. The threaded joint gives a certain adjustability of the spindle length, and the set screw serves to connect the two spindle sections so that they act as one rigid spindle in cases where it is desirable that the bars to be clamped are on the same level or have a fixed mutual angular position.

The clamping mechanism according to the invention can be used for the clamping of more than two bars, which all cross a common axis. In order to secure clamping of all bars with an equal amount of force, and without the bore of the spindle and the pipe or corresponding locations for the bars having to be made with very great accuracy, the spindle according to the invention may be made wholly or in part from a resilient material, or it may be composed of several parts mutually connected by springs between the individual bars to be clamped.

In order that the clamping of all bars can take place simultaneously, the spindle for the clamping of several bars, according to the invention, may be provided with a number of transverse voids, the extent of which in the longitudinal direction of the spindle is decreasing from the end where the pressure unit is fitted and towards the opposite end of the spindle.

Figure 2:
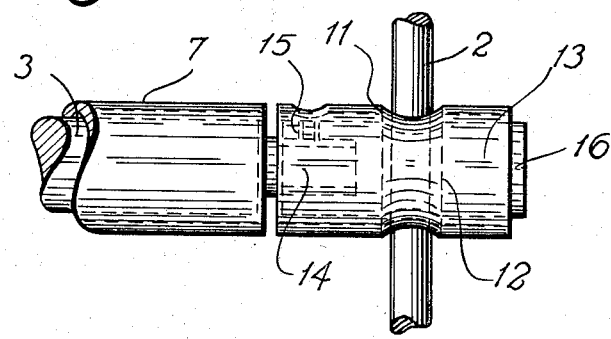

The invention is explained in further detail with reference to the drawing, wherein:

FIGURE 1 is a side view of a first embodiment of the clamping mechanism according to the invention, showing the left and right ends of a mechanism of great length, the central section of which has been foreshortened as indicated by the dot-dash lines, FIGURE 2 shows a detail of another embodiment of the clamping mechanism according to the invention, and FIGURE 3 is a side view in partial section of another embodiment of the clamping mechanism.

In the drawing, are shown two bars 1 and 2, which may, for example constitute supports for an adjustable foot section of a hospital bed not shown. A spindle 3 having at one end a threaded hole for a threaded bolt 4 with a handle 5 is located in a fixed pipe 7 having transverse holes 6 for the bars 1 and 2. The spindle 3, adjacent the holes 6, has transverse slots 8 and 9 for receiving respective bars 1. The threaded bolt 4 is screwed inwards into spindle 3 by means of the handle 5, and the end of the bolt presses against the side of the bar 1, the pressure being conveyed to the hole edges 10. By continued turning of bolt 4 the spindle 3 is drawn to the left in the drawing and the bar 2 is pressed by one side of the slot in question in the spindle, which forms a pressure surface 12, towards the hole edges 11 of the holes 6 in the pipe 7. Thereby the bar 2 is fixed, the bar 1 being at the same time retained by the same clamping force between the end of the threaded bolt 4 and the hole edges 10.

FIGURE 2 shows a part of a modified embodiment for the clamping mechanism according to the invention, where the pipe 7 is cut between the bars 1 and 2, so that the bar 2 extends through a pipe length 13, which is freely revolvable in relation to the other part of the pipe 7. The spindle 3 is likewise divided into two parts 3 and 16, which are mutually connected by means of a threaded pin 14 attached to the part 3 and screwed into the part 16, whereby these two parts also can be revolved in relation to each other. By clamping as explained above the spindle 3 moves the spindle part 16 to the left, so that the pressure surface 12 presses the bar 2 against the hole edges 11. This arrangement permits a certain angular turning between the bars 1 and 2 during adjustment. In case such angular turning may not be desired, the spindle parts 3 and 16 may be mutually connected without any facility of turning by tightening a set screw 15 against the threaded pin 14, whereby a rigid joint is obtained, which acts in the same manner as the clamping mechanism according to FIGURE 1.

In the embodiment of FIG. 3 are shown three bars 1, 2 and 18, to be clamped and secured by the inventive clamping device. The bars 1 and 2 are clamped in the same way as the bars in FIG. 1, whereas bar 18 extending through the transverse void 8″ is clamped by means of rigid disc-shaped springs 19, 20 embedded in axial bores extending from opposite side walls in the void 8″. The springs 19 and 20 are adapted to press against the side of the bar 18 through pins 21, 22 respectively. When the spindle 3′ is drawn to the left in FIG. 3, the disc-shaped spring 20, acting upon pin 22, will press the bar 18 against the edges 11″ forming fixed abutments in the tube 7, whereby the bar will be clamped between these parts at the same time as the bar 2 is clamped between the pressure surface 12 and the hole edges 11′. If the pressure member 4 is acting at the right hand of the spindle 3′, then the bar 18 is clamped between the hole edges 10″ and the pin 21 acted on the spring 19.

A shoe 29 is secured on the end of member 4 for engaging the bar 1 as illustrated in FIG. 3.

What I claim and desire to secure by Letters Patent is:

1. A clamping mechanism for the clamping of at least two bars in relation to an axis intersecting said bars, said mechanism comprising a spindle extending along said axis for longitudinal displacement and receiving said bars, abutment means adjacent each bar for engaging the same, and pressure means in engagement with said spindle and displaceable with respect thereto for first engaging a first bar and clamping the same between the associated abutment means and the pressure means and for thereafter displacing the spindle and the other of the bars into contact with the associated abutment means such that each of the other of the bars is then clamped between the spindle and its associated abutment means, said abutment means being constituted by a pipe coaxially mounted with respect to the spindle and having transverse holes for the passage of the bars, said spindle having slots therein for the passage of the bars, said slot which receives said first bar having a sufficient extent in the longitudinal direction to enable displacement of the spindle while the first bar remains clamped between the pressure means and a wall of the associated hole in the pipe.

2. A clamping mechanism as claimed in claim 1, wherein said pressure means comprises a rotatable member threadably engaged in the spindle and extending into the slot which receives the first bar for engaging such bar.

3. A clamping mechanism as claimed in claim 2, comprising a transverse member on said rotatable member for rotating the same.

4. A clamping mechanism as claimed in claim 2 comprising a thrust shoe on said rotatable member having a pressure surface corresponding to the surface of said bar for contacting the same.

5. A clamping mechanism as claimed in claim 1, wherein said pipe comprises separate sections, one for each bar, said spindle including separate sections for each bar connected together for relative free angular movement.

6. A clamping mechanism as claimed in claim 5, wherein adjacent spindle sections are threadably connected together, and a transverse set screw between said sections for mutually locking the same together.

7. A clamping mechanism as claimed in claim 1, wherein said spindle is constituted at least in the region of said slots of elastic material.

8. A clamping mechanism as claimed in claim 1, wherein said spindle is constituted by a plurality of sections mutually connected by springs between the individual bars to be clamped.

9. A clamping mechanism as claimed in claim 1, wherein the slots in the spindle diminish in longitudinal extent from the slot which receives said first bar towards the other of the slots.

References Cited

UNITED STATES PATENTS

| 491,297 | 2/1893 | Stowe | 206—1.5 X |
| 1,137,333 | 4/1915 | Klorer | 287—49 |
| 3,033,310 | 5/1962 | McLeod | 182—228 X |

FOREIGN PATENTS

| 125,512 | 4/1919 | Great Britain. |
| 450,656 | 7/1949 | Italy. |

CARL W. TOMLIN, *Primary Examiner.*

A. V. KUNDRAT, *Assistant Examiner.*